(12) United States Patent
Compagnon et al.

(10) Patent No.: US 10,946,566 B2
(45) Date of Patent: Mar. 16, 2021

(54) METHOD FOR PRODUCING A PART AND ASSOCIATED GRIPPING DEVICE

(71) Applicant: Flex-N-Gate France, Audincort (FR)

(72) Inventors: Philippe Compagnon, Valentigney (FR); Thierry Receveur, Villars les Blamont (FR)

(73) Assignee: FLEX-N-GATE FRANCE, Audincourt (FR)

( * ) Notice: Subject to any disclaimer, the term of this patent is extended or adjusted under 35 U.S.C. 154(b) by 377 days.

(21) Appl. No.: 15/883,742

(22) Filed: Jan. 30, 2018

(65) Prior Publication Data

US 2018/0215085 A1    Aug. 2, 2018

(30) Foreign Application Priority Data

Jan. 30, 2017    (FR) ..................... 17 50722

(51) Int. Cl.
*B29C 45/14* (2006.01)
*B29C 31/08* (2006.01)
(Continued)

(52) U.S. Cl.
CPC ........ *B29C 45/14008* (2013.01); *B29C 45/14* (2013.01); *B29C 45/14065* (2013.01); *B29C 45/14073* (2013.01); *B29C 45/14221* (2013.01); *B29C 45/14786* (2013.01); *B25J 15/0071* (2013.01); *B29C 31/008* (2013.01); *B29C 31/08* (2013.01); *B29C 45/0005* (2013.01); *B29C 45/14262* (2013.01); *B29C 45/72* (2013.01); *B29C 2045/14295* (2013.01);
(Continued)

(58) Field of Classification Search
CPC ........... B29C 2045/14901; B29C 2045/14147; B29C 45/14008; B29C 45/14221
See application file for complete search history.

(56) References Cited

U.S. PATENT DOCUMENTS 7,290,639 B2 * 11/2007 Sato .................. B29C 45/14344
    181/167
7,320,582 B2 *  1/2008 Muller .................. B29C 45/045
    425/112

(Continued)

FOREIGN PATENT DOCUMENTS

| DE | 102011050102 A1 | 11/2012 |
| EP | 3034265 A1 | 6/2016 |
| WO | WO2015151054 A1 | 10/2015 |

OTHER PUBLICATIONS

French Search Report in French for application No. FR1750722, dated Aug. 9, 2017, 2 pages.

*Primary Examiner* — Benjamin A Schiffman
(74) *Attorney, Agent, or Firm* — Reising Ethington P.C.

(57) ABSTRACT

A method for producing a part includes the steps of: positioning an insert in a mold via a gripping element, able to be actuated between an inactive configuration and an active configuration, of a gripping device comprising a shaping wall; shaping the insert in a reinforcing element against a surface; during positioning, maintaining a separation between the surface and the insert, and moving the shaping wall to apply the insert against the surface; and during the shaping, applying the shaping wall and the gripping element against the insert and the surface, the element being actuated in its inactive configuration before the application of the shaping wall.

10 Claims, 5 Drawing Sheets

(51) Int. Cl.
  *B25J 15/00*  (2006.01)
  *B29C 31/00*  (2006.01)
  *B29C 45/72*  (2006.01)
  *B29C 45/00*  (2006.01)
  *B29K 23/00*  (2006.01)
  *B29K 77/00*  (2006.01)
  *B29L 31/30*  (2006.01)

(52) U.S. Cl.
  CPC ............... *B29C 2045/14877* (2013.01); *B29C 2045/14901* (2013.01); *B29K 2023/12* (2013.01); *B29K 2077/00* (2013.01); *B29L 2031/3005* (2013.01)

(56) References Cited

U.S. PATENT DOCUMENTS

| | | | |
|---|---|---|---|
| 7,704,428 B2 * | 4/2010 | Takayama | B29C 45/1418 264/255 |
| 8,673,195 B2 * | 3/2014 | Gillard | B29C 45/1671 264/250 |
| 9,488,851 B2 * | 11/2016 | Francavilla | G02C 5/008 |
| 10,343,315 B2 * | 7/2019 | Cho | B29C 45/1418 |
| 2016/0176087 A1 * | 6/2016 | Menard | B29C 45/14221 442/59 |
| 2017/0129141 A1 * | 5/2017 | Masaka | B29C 33/202 |
| 2017/0239859 A1 * | 8/2017 | Packett | B32B 5/26 |

\* cited by examiner

METHOD FOR PRODUCING A PART AND ASSOCIATED GRIPPING DEVICE

TECHNICAL FIELD

The present invention relates to a method for producing a part comprising at least one reinforcing element manufactured from a fibrous insert made from a composite material, using an injection mold comprising a first part and a second part, each comprising a molding surface, said molding surfaces defining a molding cavity between them having the form of a part to be produced, the method comprising the following steps:

transporting and positioning the fibrous insert on the first part of the injection mold by at least one gripping element of a gripping device, the gripping device further comprising a shaping wall, the gripping element being able to be actuated between an inactive configuration, in which it does not interact with the fibrous insert, and an active configuration, in which it is able to keep the fibrous insert on the gripping device, the gripping element being in the active configuration during the transport and positioning;

shaping the fibrous insert into the reinforcing element against the molding surface of the first part; and injecting a plastic material in the injection mold, such that the reinforcing part is overmolded by the plastic material and the part is produced.

BACKGROUND

The addition of a fibrous insert in a part makes it possible to improve the mechanical properties of the part while reducing the quantity of plastic material needed. It is thus possible to reduce the mass of the part while increasing its mechanical strength. A fibrous insert can be shaped simply and connected closely to the plastic material overmolding it.

Such a method is in particular known from document EP 3,034,265, and is typically intended to produce a reinforcing and/or aesthetic part for an automobile or truck. The method described in this document may be carried out using a gripping device as well as particular shims in the injection mold to allow the precise positioning of the fibrous insert on the first part of the injection mold, shaping thereof, and to ensure its maintenance to guarantee the overmolding on the appropriate face.

However, the use of particular shims to ensure the maintenance of the fibrous insert in the module does not make it possible to optimize the shape of the fibrous insert. Additionally, this leads to greater complexity in the design of the mold, the latter necessarily having to comprise means for fastening the insert suitable for different sizes and thicknesses of insert. The presence of shims being able to be a source of aesthetic flaws, eliminating them improves the quality of the production. Lastly, the presence of particular shims entails an extra cost for purchase and maintenance.

Another solution involves shaping the fibrous insert between the molding surfaces of the two parts of the mold. Yet the molding surface of the second part typically has the texture that the part is intended to have on its surface, and the fibrous insert comprises fibers, for example glass fibers. Thus, during the repeated shaping of fibrous inserts by the second part, the repeated contact of the fibers of the inserts with the molding surface of the second part wears and damages this molding surface, which leads to appearance flaws in the surface of the part.

SUMMARY

In at least some embodiments, the invention therefore aims to provide a method for producing a part making it possible to obtain a part having homogeneous, sufficient and reproducible mechanical characteristics, as well as a surface with no aesthetic flaws and reproducible overmolding thicknesses, while retaining a cycle time compatible with the mass production of parts.

To that end, the invention relates to a production method of the aforementioned type, wherein it comprises the following steps:

during the positioning of the fibrous insert on the molding surface of the first part: bringing the fibrous insert closer to the molding surface of the first part while maintaining a separation between said molding surface and the fibrous insert; and moving the shaping wall relative to the gripping element so as to apply the fibrous insert against part of the molding surface; and during the shaping of the fibrous insert: applying the shaping wall and the gripping element against the fibrous insert and the molding surface of the first part, such that the fibrous insert acquires the shape of the molding surface, the gripping element being actuated from its active configuration to its inactive configuration before said application of the shaping wall.

The method works with any type of fibrous insert and any type of plastic material for the injection step.

The positioning of the fibrous insert is also more precise, and the method makes it possible to shape the reinforcing element as it will be present in the produced part.

The second part of the injection mold not performing the shaping of the insert, it is not damaged during the production of the part, which also allows noteworthy preservation of the final appearance of the part.

The method makes it possible to use different thicknesses for the fibrous insertion without major difficulties. Moreover, it makes it possible to use an identical air gap in the injection mold for different fibrous insert thicknesses. It is therefore possible to modify the thickness of the fibrous insert after producing the injection mold if the needed, for example to increase or decrease the mechanical performance of the part. Alternatively, the distance between the second part of the mold and the top of the fibrous insert is controlled and makes it possible to obtain a homogeneous final surface state with satisfactory quality for a trim part.

Furthermore, a single gripping device performing all of the steps of the method, aside from the injection step, the cost of the installation and the footprint that it occupies are reduced.

The production method may comprise one or more of the following optional features, considered alone or according to any technically possible combination(s):

the method comprises a step for maintaining the fibrous insert against the molding surface of the first part of the injection mold, this maintenance being done by the gripping element before the shaping step, and by the shaping wall during the shaping step;

the shaping wall has a surface with a shape substantially complementary to at least part of the molding surface of the first part; and the gripping element comprises a gripping member for the fibrous insert, movable between a retracted position, in the inactive configuration of the gripping element, and a retaining position, in the active configuration of the gripping element, the gripping member fixing the fibrous insert on the gripping element in the retaining position.

Such a production method makes it possible to eliminate a system for fastening the fibrous insert integrated into the injection mold, which makes it possible to save on the cost of the injection mold and allows a freer design of the part. Doing away with a fastening system of the fibrous insert integrated into the injection mold also leads to a more in-depth optimization of the surface of the fibrous insert used, and therefore cost savings.

Advantageously, the method comprises transporting and positioning at least one metal insert on the molding surface of the first injection mold part before positioning the fibrous insert on the molding surface of the first part.

The method makes metal inserts easier to use, and in particular makes it possible to use metal inserts adapted to the fibrous insert, i.e., metal inserts not requiring making additional holes to mount them in the fibrous insert. The mechanical performance of the part is therefore not deteriorated by the metal inserts.

Preferably, the method comprises a step for regulating the temperature of the gripping device.

Advantageously, the method comprises heating the fibrous insert before shaping it, and cooling the fibrous insert after it is shaped and before the step for injecting a plastic material into the injection mold.

The temperature regulation of the gripping device makes it possible to guarantee the temperature of the fibrous insert during the overmolding, and therefore to optimize the adherence of the plastic material overmolded on the fibrous insert. The mechanical performance of the part is therefore optimized and controlled.

Advantageously, the method comprises, during the shaping of the fibrous insert, a step for applying shaping pressure on the fibrous insert via an additional system for applying an additional pressure on the gripping device.

Preferably, during the positioning of the fibrous insert, the fibrous insert is kept separated from the molding surface during the movement of the shaping wall.

Advantageously, during the positioning of the fibrous insert, the region of the fibrous insert across from each gripping element is kept separated from the molding surface during the movement of the shaping wall.

The invention also relates to a gripping device for transporting, positioning and shaping a fibrous insert for the method as defined above, the gripping device comprising a gripping element and a shaping wall, the gripping element being able to be actuated between an inactive configuration, in which it does not interact with the fibrous insert, and an active configuration, in which it is able to keep the fibrous insert on the gripping device; the gripping element and the shaping wall of the gripping device being movable relative to one another, the gripping element traversing the shaping wall.

The gripping device may comprise one or more of the following optional features, considered alone or according to any technically possible combination(s):
- the gripping device has a shaping configuration in which the gripping element and the shaping wall define a continuous shaping surface;
- the gripping element comprises a gripping member for the fibrous insert, movable between a retracted position, in the inactive configuration of the gripping element, and a retaining position, in the active configuration of the gripping element, the gripping member fixing the fibrous insert on the gripping element in the retaining position; and
- the gripping member comprises needles intended to traverse the fibrous insert.

BRIEF DESCRIPTION OF THE DRAWINGS

The invention and its advantages will be better understood upon reading the following description, provided solely as an example, and done in reference to the appended drawings, in which.

DETAILED DESCRIPTION OF THE ILLUSTRATED EMBODIMENT

Figure 1:
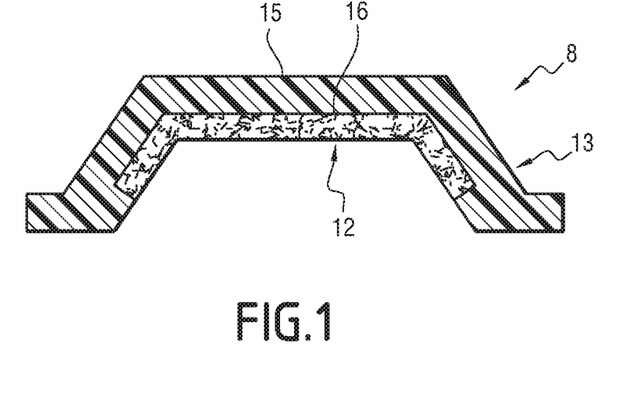
FIG. 1 is a schematic sectional view of a part produced using the method according to the invention.

FIG. 1 shows an example of a part 8 produced using the production method according to the invention, this method being carried out by the installation 10 illustrated in FIGS. 2 to 8.

More specifically, the part 8 is for example a reinforcing and/or trim part, such as a vehicle body part. A reinforcing part more generally refers to a part intended to be assembled to another part of a vehicle to reinforce it. A trim part more generally refers to a part whereof at least one portion is intended to be visible from the inside and/or the outside of a vehicle.

The part 8 comprises at least one reinforcing element 12 overmolded by a plastic body 13. The overmolding of the plastic body 13 is carried out by injecting a plastic material on the reinforcing element 12 in an injection mold as described hereinafter. The part 8 shown in FIG. 1 is only shown as an example and may have any type of shape. For example, the plastic body 13 may comprise ribs, screwing shafts, etc.

The reinforcing element 12 for example has a three-dimensional shape such as, for instance, a bowl shape, or a parabolic shape or U shape or the like. The shape of the reinforcing element 12 primarily depends on the part 8 to be produced.

The reinforcing element 12 is used to improve the mechanical strength of the part 8 to be produced and to increase its rigidity, such that the part 8 to be produced is able to support a predetermined load.

Figure 5:
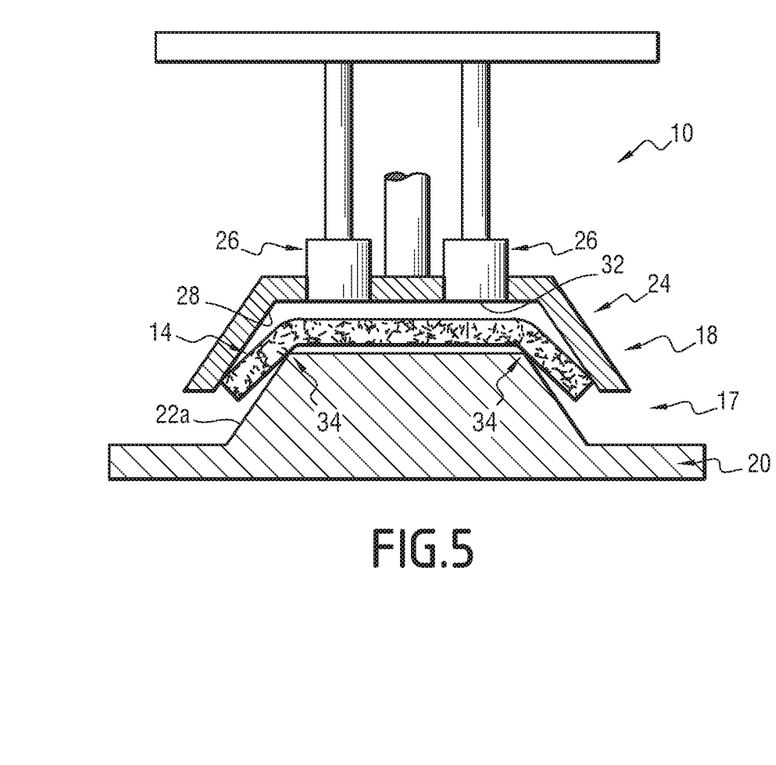
Figure 6:
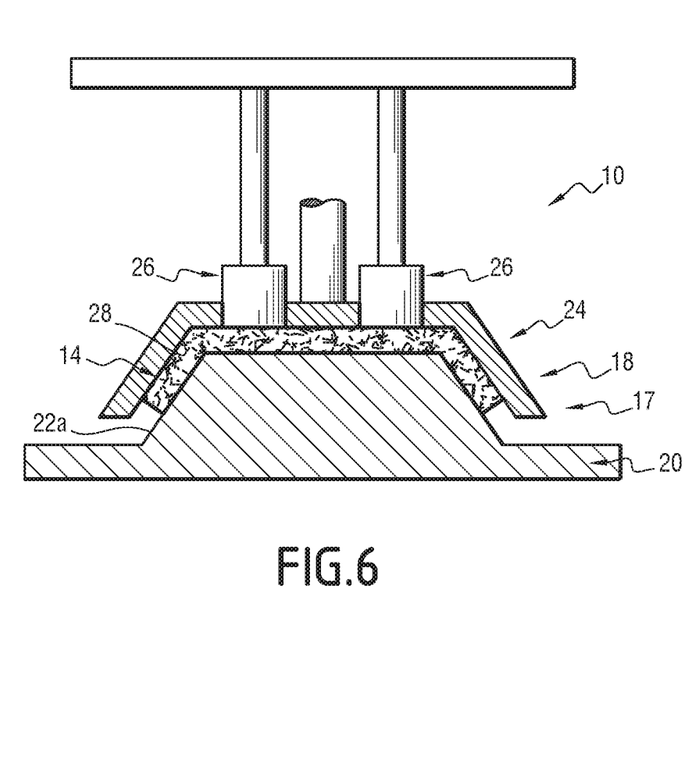
Figure 7:
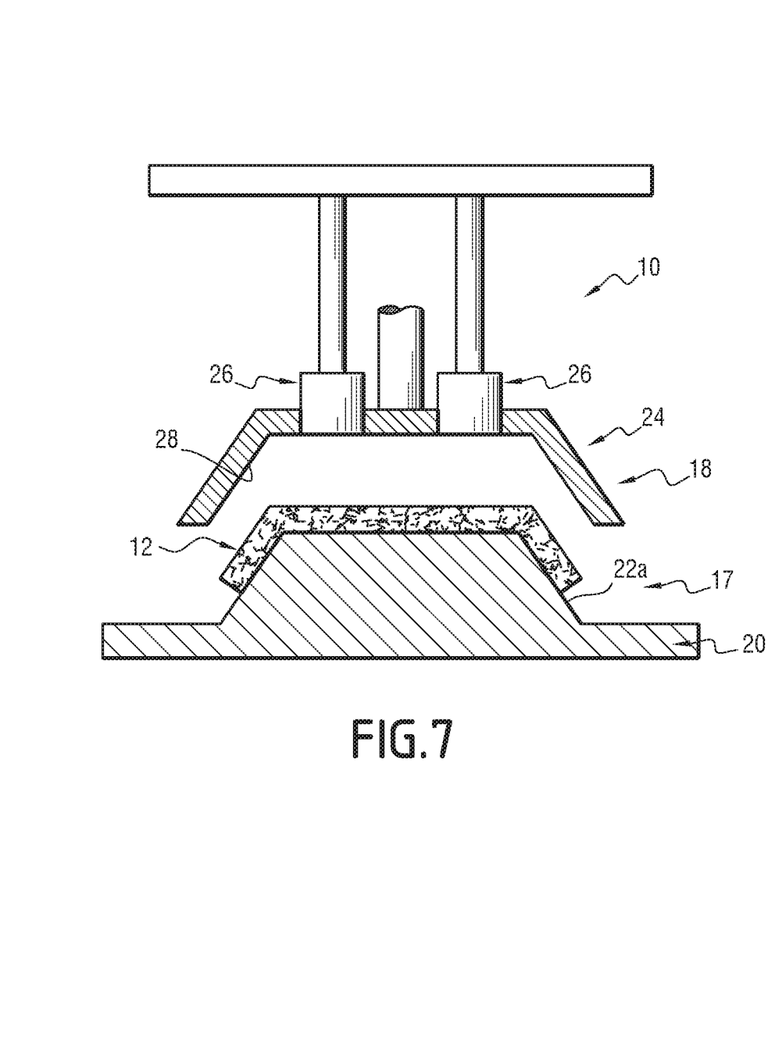
Figure 8:
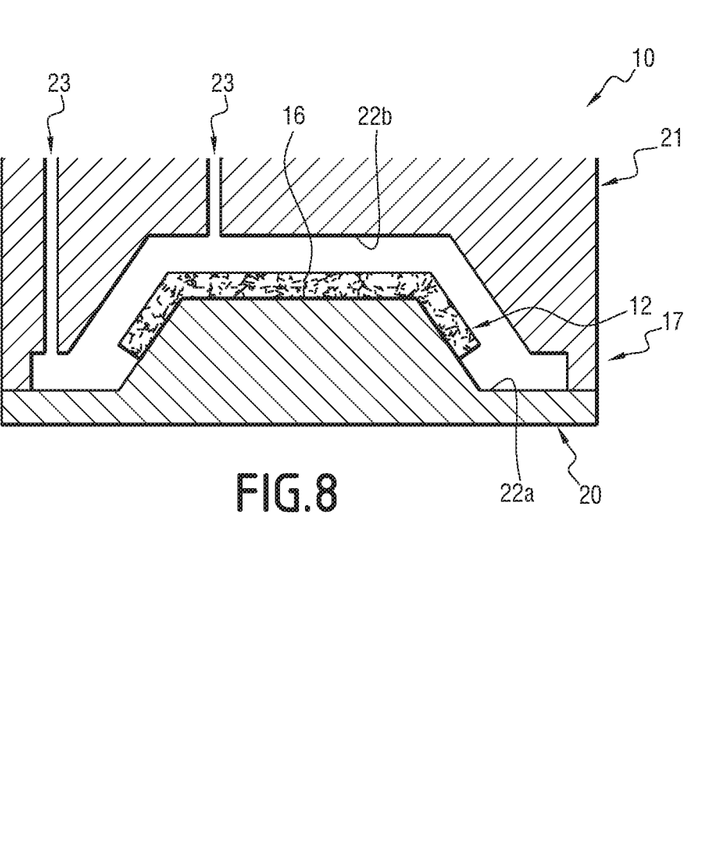

The reinforcing element 12, visible in FIGS. 1, 7 and 8, is manufactured from a fibrous insert 14 mixed with a matrix of a plastic material, visible in FIGS. 2 to 6.

The fibrous insert 14 for example comprises a fabric or a plurality of fabrics of a composite material comprising unidirectional and continuous fibers or plaits woven together in one direction or two perpendicular directions. The fibers are for example glass fibers, or alternatively carbon fibers or any other type of fibers. The fabric is for example made up of a mixed assembly of fibers of different origins, such as an assembly of glass fibers and carbon fibers or an assembly of carbon fibers and Kevlar fibers. The fibers for example may or may not be pre-impregnated.

The plastic material of the matrix of the fibrous insert 14 is for example propylene or polyamide. The plastic material of the matrix is for example the same as that used to produce the plastic body 13, which improves the bonds between the insert 14 and the body 13.

The plastic body 13 forms a main outer surface 15 of the part 8 and covers an outer surface 16 of the reinforcing element 12. Once the part 8 is mounted in the vehicle, the main outer surface 15 is the surface intended to be seen from the inside and/or outside of the vehicle.

The main outer surface 15 for example has grains, i.e., it has unevenness spots forming a regular or irregular pattern, all or some of which has grains.

The plastic body 13 is for example more extensive than the reinforcing element 12, the reinforcing element 12 then extending only over a region of the plastic body 13 and not over the entire plastic body 13. Alternatively, the reinforcing element 12 extends over the entire plastic body 13.

The plastic body 13 has a thickness that is for example constant, the part 8 having a thickness, in line with the reinforcing element 12, greater than the thickness of the plastic body 13. Alternatively, the part 8 has a thickness, in line with the reinforcing element 12, greater or less than the thickness of the plastic body 13. In another alternative, the thickness of the plastic body 13 is adapted so that thickness of the part 8 is constant. In still another alternative, the thickness of the part 8 is variable.

In one embodiment, the part 8 comprises a plurality of reinforcing elements 12 distributed over the regions of the part 8, and spaced apart from one another or connected to one another. The part 8 for example comprises ribs, fastening spots of a metal insert and the like.

The installation 10 comprises a device for heating the fibrous insert 14, an injection mold 17 and a gripping device 18.

The device for heating the fibrous insert 14 is configured to heat the fibrous insert 14 past a predetermined heating temperature.

The predetermined heating temperature depends on the number of fabrics making up the fibrous insert 14 and the nature of the matrix of the fibrous insert 14.

The predetermined heating temperature is higher than the melting temperature of the matrix of the fibrous insert 14.

The device for heating the fibrous insert 14 is configured to heat the fibrous insert 14 homogeneously over the entire expanse of the fibrous insert 14. Such heating makes it possible to make the fibrous insert 14 malleable to allow the three-dimensional shaping of the fibrous insert 14.

The heating device is for example a furnace.

The injection mold 17 comprises a first part 20, visible in FIGS. 2 to 8, and a second part 21, visible in FIG. 8. Each of the first part 20 and the second part 21 comprises a molding surface 22a, 22b, respectively. The molding surfaces 22a, 22b are similar and extend across from one another.

The first part 20 here is intended to accommodate the fibrous insert 14. The first part 20 is further intended to shape the fibrous insert 14 into a reinforcing element 12.

The first part 20 and/or the second part 21 comprises one or several injection inlets 23 for the plastic material forming the plastic body 13 of the part 8 to be produced.

In the example of FIG. 8, the first part 20 comprises an injection inlet 23 emerging across from the reinforcing element 12. When the plastic body 13 is intended to have a main outer surface 15 with grains, the molding surface 22b of the second part 21 then has grains. More generally, the molding surface 22b of the second part 21 has the texture that the main outer surface 15 is intended to present.

The first part 20 and the second part 21 are movable relative to one another between an open position of the injection mold 17, illustrated in FIGS. 2 to 7, in which the second part 21 is positioned away from the first part 20, and a closed position of the injection mold 17, illustrated in FIG. 8, in which the molding surfaces 22a, 22b define a molding cavity between them having the shape of the part 8 to be produced.

When the injection mold 17 is in its open position, the molding surfaces 22a, 22b are accessible to position elements in the injection mold 17 or to remove elements from the injection mold 17, as illustrated in FIGS. 2 to 7.

The injection mold 17 may be of any type. In the example of FIG. 8, the injection mold 17 comprises a sealing surface between the first part 20 and the second part 21. In an alternative that is not shown, the injection mold 17 comprises a compression chamber making it possible to vary the separation between the molding surfaces 22a, 22b, when the injection mold 17 is in the closed position.

Such injection molds 17 are known from the state of the art and will not be described in more detail below.

The fibrous insert 14 is intended to be positioned and maintained on a part of the molding surface 22a of the first part 20.

Advantageously, the maintenance of the fibrous insert 14 against the molding surface 22a of the first part 20 is ensured solely by the gripping device 18.

More specifically, the injection mold 17 for example has no system for fastening the fibrous insert 14 on the injection mold 17. Alternatively, the injection mold 17 comprises such a fastening system, which is for example a suction device, or a device including points or needles making it possible to maintain the fibrous insert 14 during shaping thereof.

The gripping device 18 is intended for transporting, positioning and shaping the fibrous insert 14.

The gripping device 18 is movable relative to the heating device and the injection mold 17. The gripping device 18 is thus for example mounted on a Cartesian robot or a multiaxial robot allowing movements in several directions of the gripping device 18.

The gripping device 18 comprises a shaping wall 24 and a gripping element 26. Furthermore, the gripping device 18 for example comprises a system for transporting and positioning at least one metal insert (not shown).

The shaping wall 24 has a surface 28 turned toward the molding surface 22a of the first part 20 with a shape substantially complementary to the shape that the reinforcing element 12 has in the part 8, once the part 8 is produced. In particular, the shaping wall 24 has a surface 28 with a shape substantially complementary to at least the part of the molding surface 22a of the first part 20 on which the fibrous insert 14 must be positioned.

The gripping device 18 for example comprises a plurality of gripping elements 26 distributed to allow the fibrous insert 14 to be gripped in several places. In the example of FIGS. 2 to 7, the gripping device 18 comprises two gripping elements 26.

As illustrated in FIGS. 2 to 7, each gripping element 26 traverses the shaping wall 24.

Figure 2:
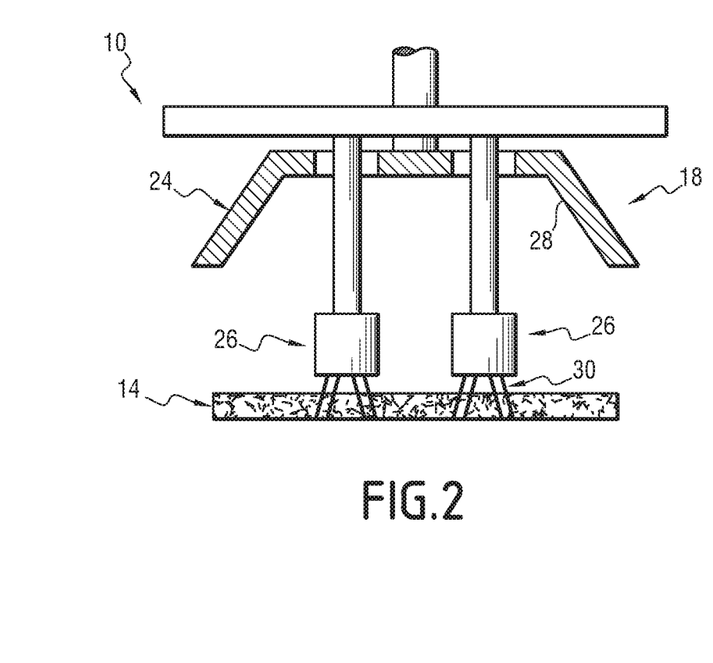
FIGS. 2 to 8 are schematic sectional views of a production installation during steps of the method according to the invention for producing the part of FIG. 1.
Figure 3:
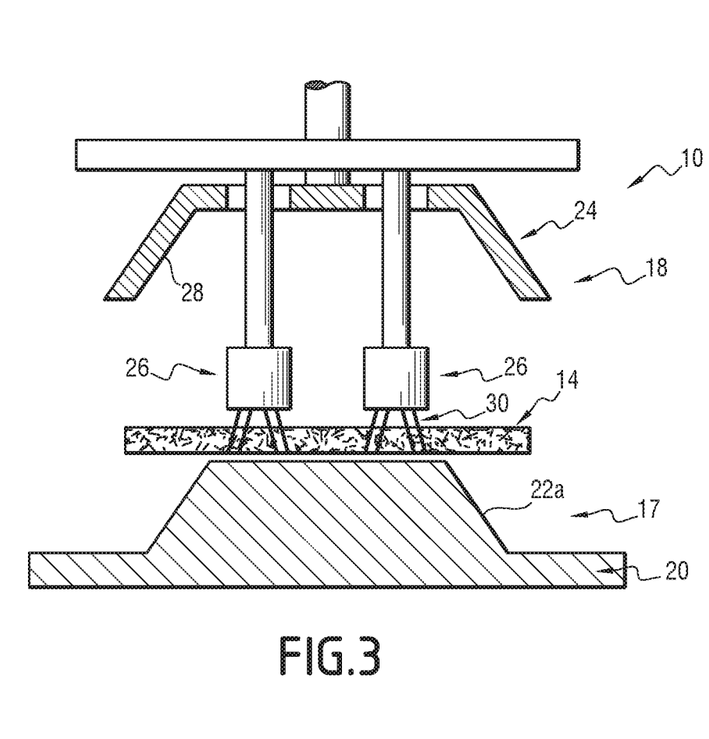
Figure 4:
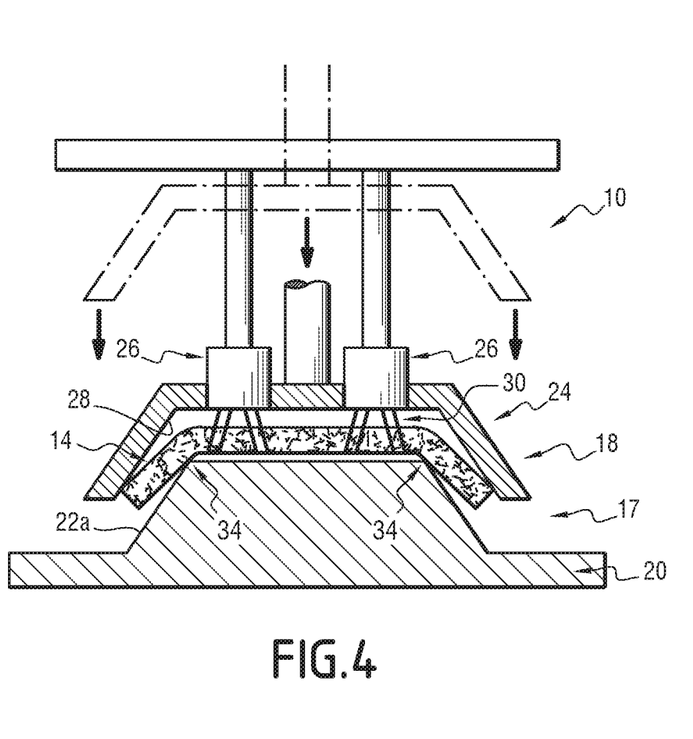

Each gripping element 26 can be actuated between an active configuration, illustrated in FIGS. 2 to 4, in which it is able to keep the fibrous insert 14 on the gripping device 18, and an inactive configuration, illustrated in FIGS. 5 to 7, in which it does not interact with the fibrous insert 14, i.e., the gripping element 26 does not keep the insert 14 in the inactive configuration.

Each gripping element 26 comprises at least one gripping member 30 for gripping the fibrous insert 14. The gripping member 30 is movable between a retracted position, in the inactive configuration of the gripping element 26, in which it does not interact with the fibrous insert 14; and a retaining position, in the active configuration of the gripping element 26, in which the gripping member 30 fixes the fibrous insert 14 on the gripping element 26.

In the example of FIGS. 2 to 4, the gripping element 26 comprises several gripping members 30 each formed by a needle intended to traverse the fibrous insert 14. Alternatively, the gripping member 30 is formed by a suction device, a suction cup or a venturi system, or the like.

Each gripping element 26 and the shaping wall 24 of the gripping device 18 are movable independently of one another. In particular, the shaping wall 24 is movable relative to each gripping element 26 between a distant position, shown in FIGS. 2 and 3, and a shaping position, visible in FIGS. 5 to 7.

In the remote position, the shaping wall 24 is positioned away from each gripping element 26.

In the shaping position of the shaping wall 24, and when the gripping member 30 of each gripping element 26 is in the retracted position, each gripping element 26 and the shaping wall 24 define a continuous shaping surface 32. Continuous means that the shaping surface 32 is uninterrupted.

This shaping position of the shaping wall 24 associated with the retracted positions of each gripping member 30 constitutes a shaping configuration of the gripping device 18.

The shaping surface 32 is intended to shape the fibrous insert 14, such that it acquires the shape of the reinforcing element 12. The shaping surface 32 is intended to press on the entire surface of the fibrous insert 14 positioned across from the gripping device 18.

The gripping device 18 is configured to exert, on the fibrous insert 14, against the molding surface 22a of the first part 20, a shaping pressure for example comprised between 10 bar and 20 bar in the shaping configuration.

The gripping device 18 is configured to exert, on the fibrous insert 14, against the molding surface 22a of the first part 20, a pressure for maintaining the fibrous insert 14 able to keep the fibrous insert 14 in position on the shaping surface 32.

Thus, it is not necessary to provide retaining elements in the first part of the mold.

The system for transporting and positioning at least one metal insert is movable relative to each gripping element 26 and the shaping wall 24.

The transport and positioning system is configured to maintain a metal insert, or multiple metal inserts, releasably on the gripping device 18.

The transport and positioning system is also configured to position each metal insert against the molding surface 22a of the first part 20.

Each metal insert is for example intended to allow, once overmolded on the fastening part 8, the fastening of additional elements on the part 8 or the mounting of the part 8 in a vehicle.

The gripping device 18 makes it possible to carry out a method for producing a part 8 described below.

A method for producing a part 8 using the production installation 10 described above will now be described, in reference to FIGS. 2 to 8.

The method comprises providing a fibrous insert 14, and for example providing a metal insert.

The injection mold 17 is initially in the open position and is kept in the open position until the end of shaping of the insert 14. The molding surface 22b of the second part 21 of the mold 17 is not placed in contact with the insert 14 during the production method, which protects the second part 21 from the wear associated with repeated shaping operations of fibrous inserts 14.

The fibrous insert 14 is heated in the heating device, past the predetermined heating temperature.

As illustrated in FIGS. 2 and 3, the method comprises a step for transporting and positioning the fibrous insert 14 on the first part 20 of the injection mold 17 by the gripping elements 26 of the gripping device 18.

During this transport and positioning step, the gripping device 18 is moved above the heated insert 14, and each cutting element 26 is placed in the active configuration so as to be able to transport the insert 14.

Another fibrous insert 14 is placed in the heating device.

The metal insert is also transported and positioned, by the transport and positioning system, on the molding surface 22a of the first part 20 of the injection mold 17, before positioning the fibrous insert 14 on the molding surface 22a of the first part 20.

To that end, each gripping element 26 is in the active configuration during the transport and positioning of the fibrous insert 14. More specifically, each gripping member 30 is in the retaining position and fastens the fibrous insert 14 on the gripping element 26.

During the positioning of the fibrous insert 14 on the molding surface 22a of the first part 20, the fibrous insert 14 is brought closer to the molding surface 22a of the first part 20 while maintaining a separation between said molding surface 22a and the fibrous insert 14.

The fibrous insert 14 is kept in position by each gripping member 30 in the retaining configuration.

Each gripping member 30 remains separated from the molding surface 22a of the first part 20 during the entire duration of the production method. There is no damage to the molding surface 22a of the first part 20 by the gripping members 30, or damage to the gripping members 30.

As illustrated in FIG. 4, the shaping wall 24 is then moved relative to the gripping element 26 toward the first part 20.

During its movement, the shaping wall 24 is applied on a peripheral region of the fibrous insert 14 that deforms toward the molding surface 22a of the first part 20. During this deformation, the deviation between the molding surface 22a and the fibrous insert 14 is maintained by the gripping members 30.

Preferably, during the positioning of the fibrous insert 14, the fibrous insert 14 is kept separated from the molding surface 22a during the movement of the shaping wall 24.

The fibrous insert 14 is deformed until it has at least one contact region 34 with the molding surface 22a of the first part 20, as illustrated in FIG. 4.

The movement of the shaping wall 24 is then stopped.

The fibrous insert 14 is thus preformed and is kept in position by the gripping members 30 and by the shaping wall 24 exerting the maintaining pressure against the molding surface 22a of the first part 20.

Advantageously, during the positioning of the fibrous insert 14, the region of the fibrous insert 14 across from each gripping element 26 is kept separated from the molding surface 22a during the movement of the shaping wall 24.

This feature, as well as that of the maintenance of the fibrous insert 14 separated from the molding surface 22a, respectively make it possible in particular to guarantee that there is no damage to the molding surface 22a of the first part 20 by the gripping members 30, and no damage of the gripping members 30.

The method next comprises shaping the fibrous insert 14 into the reinforcing element 12 against the molding surface 22a of the first part 20 (FIGS. 5 to 7).

Before the shaping of the fibrous insert 14, the gripping element 26 is actuated from its active configuration to its inactive configuration, as illustrated in FIG. 5. Contact is thus avoided between the molding surface 22a and the gripping members 30, which could damage the molding surface 22a of the first part 20.

The fibrous insert 14 is then kept in position by the shaping wall 24 exerting the maintaining pressure against the molding surface 22a of the first part 20.

The shaping wall 24 is moved, relative to each gripping element 26, to its shaping position.

Each gripping element 26 and the shaping wall 24 then define the continuous shaping surface 32.

During its movement, the shaping wall 32 is moved toward the molding surface 22a of the first part 20.

The shaping wall 24, and more particularly the shaping surface 32, is pressed against the fibrous insert 14 and the molding surface 22a of the first part 20, as illustrated in FIG. 6, such that the fibrous insert 14 acquires the shape of the molding surface 22a.

More particularly, the shaping surface 32 is pressed on the entire surface of the fibrous insert 14 positioned across from the gripping device 18.

The fibrous insert 14 is cooled after shaping, during a predetermined length of time, such that the matrix hardens and the reinforcing element 12 remains rigid in the shape that it has acquired. Advantageously, the shaping surface 32 is pressed on the reinforcing element 12 during cooling.

The gripping device 18 is next moved away from the molding surface 22a of the first part 20.

The injection mold 17 is next positioned in the closed position, as illustrated in FIG. 8.

The method then comprises injecting a plastic material in the molding cavity, in particular through the injection inlet 23 emerging across from the reinforcing element 12, such that the reinforcing element 12 is overmolded by the plastic material and the part 8 is produced.

After a predetermined length of time, the injection mold 17 is positioned in the open position and the part 8 is removed from the injection mold 17, for example by the gripping device 18.

The method then starts again with the step for transporting and positioning the fibrous insert 14.

Alternatively, the temperature of the gripping device 18 is regulated.

The gripping device 18 is then configured to keep the insert 14 in a malleable state during transport.

Alternatively, the fibrous insert 14 is malleable at ambient temperature. The production method then does not require heating the fibrous insert 14.

Alternatively, when the injection mold 17 is arranged in the open position, the produced part 8 is kept on the second part 21 of the injection mold 17 and is later grasped by the gripping device 18 during the shaping of another fibrous insert 14.

The second part 21 of the injection mold 17 comprises a device, not shown, for maintaining the part 8 on the second part 21.

This maintaining device is able to be actuated between a released configuration, in which the maintaining device does not interact with this part 8, and a maintaining configuration, in which the maintaining device is able to keep the part 8 against the molding surface 22b of the second part 21 of the injection mold 17.

This maintaining device is for example a suction device, such as a suction cup.

The gripping device 18 is configured to grasp a part 8 produced during a preceding method and kept on the second part 21 by the maintaining device in the maintaining configuration, during the step for shaping the fibrous insert 14.

In particular, the gripping device 18 comprises a piece of gripping equipment able to grasp a part 8 kept against the molding surface 22b of the second part 21.

The method comprises, during the shaping of the fibrous insert 14, a step for grasping, by the gripping equipment of the gripping device 18, a part 8 produced during a preceding method and kept against the second part 21 of the injection mold 17 by the maintaining device in the maintaining configuration.

The grasping step is followed by the passage of the maintaining device from its maintaining configuration to its released configuration. The part 8 is then no longer maintained on the second part 21.

When the gripping device 18 is moved away from the molding surface 22a of the first part 20, the gripping device 18 transports the part 8 grasped in the grasping step by the gripping equipment, to a given position where the grasped part 8 is deposited.

Such a method makes it possible to reduce the production time.

Alternatively, the installation 10 comprises an additional system for applying a shaping pressure on the fibrous insert 14. Such an additional system makes it possible to ensure sufficient shaping pressure on the fibrous insert 14 to perform shaping thereof.

More particularly, the additional system is configured to apply complementary pressure on the gripping device 18, in particular on the shaping wall 24 and/or on a gripping element 26.

During the shaping of the fibrous insert 14, and in particular when the shaping surface 32 is pressed against the fibrous insert 14, the method then comprises a step for applying a shaping pressure on the fibrous insert 14 via the additional system.

Figure 9:
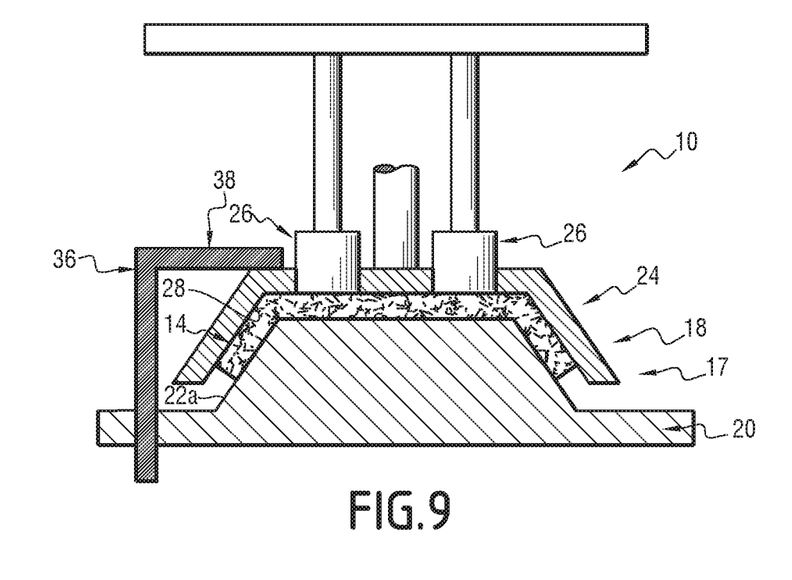
FIG. 9 is a schematic sectional view of an alternative of the installation of FIGS. 2 to 8.

In a first embodiment of this alternative, illustrated in FIG. 9, the additional system comprises at least one removable jaw 36 comprising an arm 38 able to be positioned above the shaping wall 24 and/or above a gripping element 26.

The jaw 36 is able to be positioned separated from the gripping device 18 to ensure a free movement of the shaping wall 24 and gripping elements 26 relative to the first part 20.

When the shaping wall 24 and/or a gripping element 26 is placed below the arm 38 of the jaw 36, the jaw 36 is configured to be moved toward the first part 20 to exert pressure on the shaping wall 24 and/or on the gripping element 26.

In this first embodiment, the step for applying additional shaping pressure thus comprises a step for positioning the arm 38 of the jaw 36 above the shaping wall 24 and/or above a gripping element 26 and a step for moving the jaw 36 toward the first part 20.

After the shaping of the fibrous insert 14 and before the movement of the gripping device 18 away from the molding surface 22a of the first part 20, the method comprises a step for arranging the jaw 36 separated from the gripping device 18.

In a second embodiment of this alternative that is not shown, the additional system comprises at least one removable jack able to bear on the second part 21 of the injection mold 17, positioned substantially above the first part 20, to exert additional pressure on the gripping device 18.

More specifically, the jack is able to bear on the molding surface 22b of the second part 21 and to exert the complementary pressure on an outer surface of the shaping wall 24, the outer surface being opposite the shaping surface 24. The jack is able to be arranged separated from the gripping device 18 and the second part 21 to ensure free movement of the shaping wall 24 and gripping elements 26 with respect to the first part 20.

In this second embodiment, the step for applying a complementary shaping pressure is thus carried out by the jack.

After the shaping of the fibrous insert 14 and before the movement of the gripping device 18 away from the molding surface 22a of the first part 20, the method comprises a step for arranging the jack separated from the gripping device 18 and the second part 21.

The invention claimed is:

1. A method for producing a part that comprises at least one reinforcing element manufactured from a fibrous insert made from a composite material, using an injection mold comprising a first part and a second part, each said part comprising a molding surface, said molding surfaces defining a molding cavity between them having the form of the part to be produced, the method comprising the following steps:
    transporting and positioning the fibrous insert on the first part of the injection mold by at least one gripping element of a gripping device, the gripping device further comprising a shaping wall, the gripping element being able to be actuated between an inactive configuration, in which it does not interact with the fibrous insert, and an active configuration, in which it is able to keep the fibrous insert on the gripping device, the gripping element being in the active configuration during the transport and positioning;
    shaping the fibrous insert into the reinforcing element against the molding surface of the first part;
    injecting a plastic material in the injection mold, such that the reinforcing part is overmolded by the plastic material and the part is produced;
    wherein the method comprises the following steps:
    during the positioning of the fibrous insert on the molding surface of the first part: bringing the fibrous insert closer to the molding surface of the first part while maintaining a separation between said molding surface and the fibrous insert; and moving the shaping wall relative to the gripping element so as to apply the fibrous insert against part of the molding surface; and
    during the shaping of the fibrous insert: applying the shaping wall and the gripping element against the fibrous insert and the molding surface of the first part, such that the fibrous insert acquires the shape of the molding surface, the gripping element being actuated from its active configuration to its inactive configuration before said application of the shaping wall.

2. The method according to claim 1, comprising a step for maintaining the fibrous insert against the molding surface of the first part of the injection mold, this maintenance being done by the gripping element before the shaping step, and by the shaping wall during the shaping step.

3. The method according to claim 1, wherein the shaping wall has a surface with a shape substantially complementary to at least part of the molding surface of the first part.

4. The method according to claim 1, wherein the gripping element comprises a gripping member for the fibrous insert, movable between a retracted position, in the inactive configuration of the gripping element, and a retaining position, in the active configuration of the gripping element, the gripping member fixing the fibrous insert on the gripping element in the retaining position.

5. The method according to claim 1, comprising transporting and positioning at least one metal insert on the molding surface of the first part of the injection mold before positioning the fibrous insert on the molding surface of the first part.

6. The method according to claim 1, comprising a step for regulating the temperature of the gripping device.

7. The method according to claim 1, comprising heating the fibrous insert before shaping it, and cooling the fibrous insert after it is shaped and before the step for injecting a plastic material into the injection mold.

8. The method according to claim 1, comprising, during the shaping of the fibrous insert, a step for applying shaping pressure on the fibrous insert via an additional system for applying an additional pressure on the gripping device.

9. The method according to claim 1, wherein, during the positioning of the fibrous insert, the fibrous insert is kept separated from the molding surface during the movement of the shaping wall.

10. The method according to claim 1, wherein, during the positioning of the fibrous insert, the region of the fibrous insert across from each gripping element is kept separated from the molding surface during the movement of the shaping wall.

* * * * *